United States Patent
Chen et al.

(10) Patent No.: US 8,737,333 B2
(45) Date of Patent: May 27, 2014

(54) METHOD OF POWER REPORTING AND COMMUNICATION DEVICE THEREOF

(75) Inventors: Chun-Chia Chen, New Taipei (TW); Chun-Yen Wang, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 167 days.

(21) Appl. No.: 13/280,347

(22) Filed: Oct. 25, 2011

(65) Prior Publication Data

US 2012/0113915 A1  May 10, 2012

Related U.S. Application Data

(60) Provisional application No. 61/411,192, filed on Nov. 8, 2010.

(51) Int. Cl.
| | | |
|---|---|---|
| *H04L 12/26* | (2006.01) | |
| *H04J 1/16* | (2006.01) | |
| *G08C 15/00* | (2006.01) | |
| *G06F 11/00* | (2006.01) | |
| *G01R 31/08* | (2006.01) | |

(52) U.S. Cl.
USPC ............ 370/329; 370/252; 370/328; 455/522

(58) Field of Classification Search
USPC ........... 370/329–338, 252–311; 455/452–522
See application file for complete search history.

(56) References Cited

U.S. PATENT DOCUMENTS

| 8,315,320 B2* | 11/2012 | Zhang et al. | 375/260 |
|---|---|---|---|
| 8,315,661 B2* | 11/2012 | Zong | 455/522 |
| 8,422,387 B2* | 4/2013 | Hsu | 370/252 |
| 2009/0191910 A1* | 7/2009 | Athalye et al. | 455/522 |
| 2010/0120397 A1* | 5/2010 | Kazmi et al. | 455/410 |
| 2010/0142455 A1 | 6/2010 | Imamura | |
| 2010/0158147 A1 | 6/2010 | Zhang | |
| 2010/0232385 A1 | 9/2010 | Hsu | |
| 2011/0105173 A1* | 5/2011 | Haim et al. | 455/522 |
| 2011/0274092 A1* | 11/2011 | Liu et al. | 370/335 |

(Continued)

FOREIGN PATENT DOCUMENTS

| EP | 1 912 345 A1 | 4/2008 |
|---|---|---|
| EP | 2 360 979 A1 | 8/2011 |

(Continued)

OTHER PUBLICATIONS

Catt, "Considerations on uplink power control in LTE-Advanced", 3GPP TSG RAN WG1 meeting #59bis, R1-100071, Jan. 18-22, 2010, Valencia, Spain.

(Continued)

*Primary Examiner* — Man Phan
(74) *Attorney, Agent, or Firm* — Winston Hsu; Scott Margo

(57) ABSTRACT

A method of power reporting for a mobile device configured with a plurality of uplink component carriers and/or parallel PUCCH and PUSCH transmission in a wireless communication system is disclosed. The method comprises being configured a maximum output power for at least a uplink component carrier, determining to start or stop a maximum output power reporting for the at least a uplink component carrier according to a characteristic associated to the mobile device or a network of the wireless communication system, and reporting the maximum output power for the at least a uplink component carrier to the network when the maximum output power reporting is triggered and the maximum output power reporting is started.

28 Claims, 12 Drawing Sheets

(56) References Cited

U.S. PATENT DOCUMENTS

| | | | |
|---|---|---|---|
| 2012/0083308 A1* | 4/2012 | Wang et al. | 455/522 |
| 2012/0106477 A1* | 5/2012 | Kwon et al. | 370/329 |
| 2012/0127933 A1* | 5/2012 | Worrall et al. | 370/329 |
| 2012/0294167 A1* | 11/2012 | Zhu et al. | 370/252 |
| 2012/0300703 A1* | 11/2012 | Wang | 370/328 |

FOREIGN PATENT DOCUMENTS

| | | |
|---|---|---|
| JP | 2010530692 A | 9/2010 |
| JP | 2010226720 A | 10/2010 |
| JP | 2012510785 A | 5/2012 |
| JP | 2012511266 A | 5/2012 |
| JP | 2012525030 A | 10/2012 |
| KR | 1020120048390 A | 5/2012 |
| RU | 2 353 043 | 4/2009 |
| WO | 2008155469 | 12/2008 |
| WO | 2009118367 A2 | 10/2009 |
| WO | 2010065759 A2 | 6/2010 |
| WO | 2010067766 | 6/2010 |
| WO | 2010121708 A1 | 10/2010 |
| WO | 2012059249 A1 | 5/2012 |

OTHER PUBLICATIONS

Bilal Muhammad: "Closed loop power control for LTE uplink", Nov. 2008, http://netlearning2002.org/fou/cuppsats.nsf/all/5c60d59b3faa4e4cc12575200077d462/$file/Thesis%20report.pdf, This thesis is presented as part of Degree of Master of Science in Electrical Engineering with emphasis on Telecommunications, Blekinge Institute of Technology, School of Engineering, Sweden.

Nokia Siemens Networks, Nokia Corporation, Triggers for Power Headroom Reports in EUTRAN Uplink, 3GPP TSG RAN WG1 #52 Meeting, R1-080947, Feb. 11-15, 2008, Sorrento, Italy.

TSG RAN WG1, LS response on per-UE PHR, 3GPP TSG RAN WG2 Meeting #72, R2-106046, Nov. 15-19, 2010, Jacksonville, USA, 3GPP TSG-RAN WG1 #62bis, R1-105796, Oct. 11-15, 2010, Xi'an, China, XP050491881.

LG Electronics, Power Headroom Report in Carrier Aggregation, 3GPP TSG-RAN WG1 Meeting #62bis, R1-105650, Oct. 11-15, 2010, XP050450758, Xian, China.

* cited by examiner

METHOD OF POWER REPORTING AND COMMUNICATION DEVICE THEREOF

CROSS REFERENCE TO RELATED APPLICATIONS

This application claims the benefit of U.S. Provisional Application No. 61/411,192, filed on Nov. 8, 2010 and entitled "Methods and System of Configured Maximum Output Power Report", the contents of which are incorporated herein in their entirety.

BACKGROUND OF THE INVENTION

1. Field of the Invention

The application relates to a method utilized in a wireless communication system and a communication device thereof, and more particularly, to a method of power reporting in a wireless communication system and a related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

The power headroom report is generated by a power headroom reporting (PHR) procedure, and is used to provide the serving eNB with information about the difference between the maximum UE transmission (TX) power and an estimated TX power for Uplink Share Channel (UL-SCH) and/or UL Control Channel. With power headroom (PH) information sent by the UE, the network can allocate radio resource to the UE and make schedule decision more efficiently. In the PHR procedure, the UE uses a MAC control element in a MAC protocol data unit (PDU) to carry PH information.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation (CA) is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple (downlink and uplink) component carriers for simultaneously receiving and transmitting.

In carrier aggregation, the UE only has one RRC connection with the network. At RRC connection establishment/re-establishment/handover, one serving cell provides the NAS mobility information, and at RRC connection re-establishment/handover, one serving cell provides the security input. This cell is referred to as a Primary serving cell (PCell). In the downlink, the carrier corresponding to the PCell is the Downlink Primary Component Carrier (DL PCC) while in the uplink it is the Uplink Primary Component Carrier (UL PCC). In addition, cells other than the PCell are named secondary serving cell (SCell).

In LTE-A system (e.g. Rel-10), parallel physical uplink control channel (PUCCH) and physical uplink shared channel (PUSCH) transmission have been supported. Consequently, eNB should take into account PUCCH and PUSCH transmission power contributing to the UE current transmission power, so as to assist eNB to schedule PUSCH and PUCCH. Note that, for uplink resource, the PCell has PUSCH and PUCCH, but SCell only has PUSCH.

Note that, in LTE-A system, PH information shall be reported for all of the configured or activated uplink component carriers. This shall be well-known in the art, so it is not given herein. In addition, a maximum output power reporting for a configured/activated component carrier is agreed in LTE-A system. The maximum output power represents the allowed maximum output power for the UE on the configured/activated component carrier, and is used for calculation for the reported power headroom report for the configured/activated component carrier. However, the LTE-A system does not clearly specify how to report the maximum output power for the configured/activated component carrier. For example, what format shall be used for the maximum output power report and when the maximum output power report shall be reported is never concerned.

SUMMARY OF THE INVENTION

The application discloses a method of power reporting in a wireless communication system and a related communication device in order to solve the abovementioned problem.

A method of power reporting for a communication device configured with a plurality of uplink component carriers and/or parallel PUCCH and PUSCH transmission in a wireless communication system is disclosed. The method comprises being configured a maximum output power for at least a uplink component carrier, determining to start or stop a maximum output power reporting for the at least a uplink component carrier according to a characteristic associated to the mobile device or a network of the wireless communication system, and reporting the maximum output power for the at least a uplink component carrier to the network when the maximum output power reporting is triggered and the maximum output power reporting is started.

A method of handling power reporting for a network in a wireless communication system is disclosed. The method comprises configuring a plurality of uplink component carriers and/or parallel PUCCH and PUSCH transmission to a mobile device of the wireless communication system, providing information related to a maximum output power configuration for at least a uplink component carrier, and performing power control and/or resource management for at least a uplink component carrier according to a reception of a maximum output power report from the mobile device.

A mobile device of a wireless communication system for power reporting is disclosed. The mobile device is configured with a plurality of uplink component carriers and/or parallel PUCCH and PUSCH transmission and comprises means for being configured a maximum output power for at least a uplink component carrier, means for determining to start or stop a maximum output power reporting for the at least a uplink component carrier according to a characteristic associated to the mobile device or a network of the wireless communication system, and means for reporting the maximum output power for the at least a uplink component carrier to the network when the maximum output power reporting is triggered and the maximum output power reporting is started.

A network of a wireless communication system for handling power reporting is disclosed. The network comprises means for configuring a plurality of uplink component carriers and/or parallel PUCCH and PUSCH transmission to a mobile device of the wireless communication system, means for providing information related to a maximum output power configuration for at least a uplink component carrier, and means for performing power control and/or resource management for at least a uplink component carrier according to a reception of a maximum output power report from the mobile device.

A method of handling power reporting for a network in a wireless communication system is disclosed. The method comprises configuring a plurality of uplink component carriers and/or parallel PUCCH and PUSCH transmission to a mobile device of the wireless communication system, providing information related to a maximum output power configuration for at least a uplink component carrier, and determining to start or stop a maximum output power reporting for the at least a uplink component carrier in the mobile device according to a characteristic associated to the mobile device or the network.

A network of a wireless communication system for handling power reporting is disclosed. The network comprises means for configuring a plurality of uplink component carriers and/or parallel PUCCH and PUSCH transmission to a mobile device of the wireless communication system, means for providing information related to a maximum output power configuration for at least a uplink component carrier, and means for determining to start or stop a maximum output power reporting for the at least a uplink component carrier in the mobile device according to a characteristic associated to the mobile device or the network.

A method of power reporting for a mobile device configured with a plurality of uplink component carriers and/or parallel PUCCH and PUSCH transmission in a wireless communication system is disclosed. The method comprises being configured a maximum output power for at least a uplink component carrier, and reporting the maximum output power for the at least a uplink component carrier to the network when a maximum output power reporting is triggered and the maximum output power reporting is determined to be started by the network.

A mobile device of a wireless communication system for power reporting is disclosed. The mobile device is configured with a plurality of uplink component carriers and/or parallel PUCCH and PUSCH transmission and comprises means for being configured a maximum output power for at least a uplink component carrier, and means for reporting the maximum output power for the at least a uplink component carrier to the network when a maximum output power reporting is triggered and the maximum output power reporting is determined to be started by the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
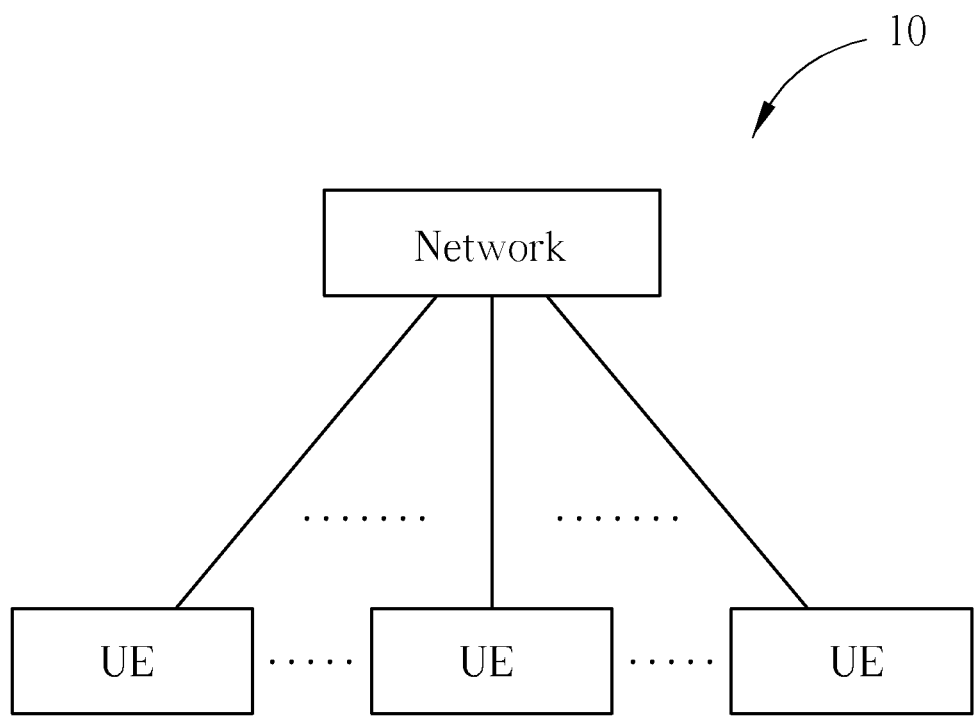
FIG. 1 illustrates a schematic diagram of an exemplary wireless communication system.

Please refer to FIG. 1, which is a schematic diagram of a wireless communication system 10. The wireless communication system 10 is a Long-Term Evolution advanced (LTE-A) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
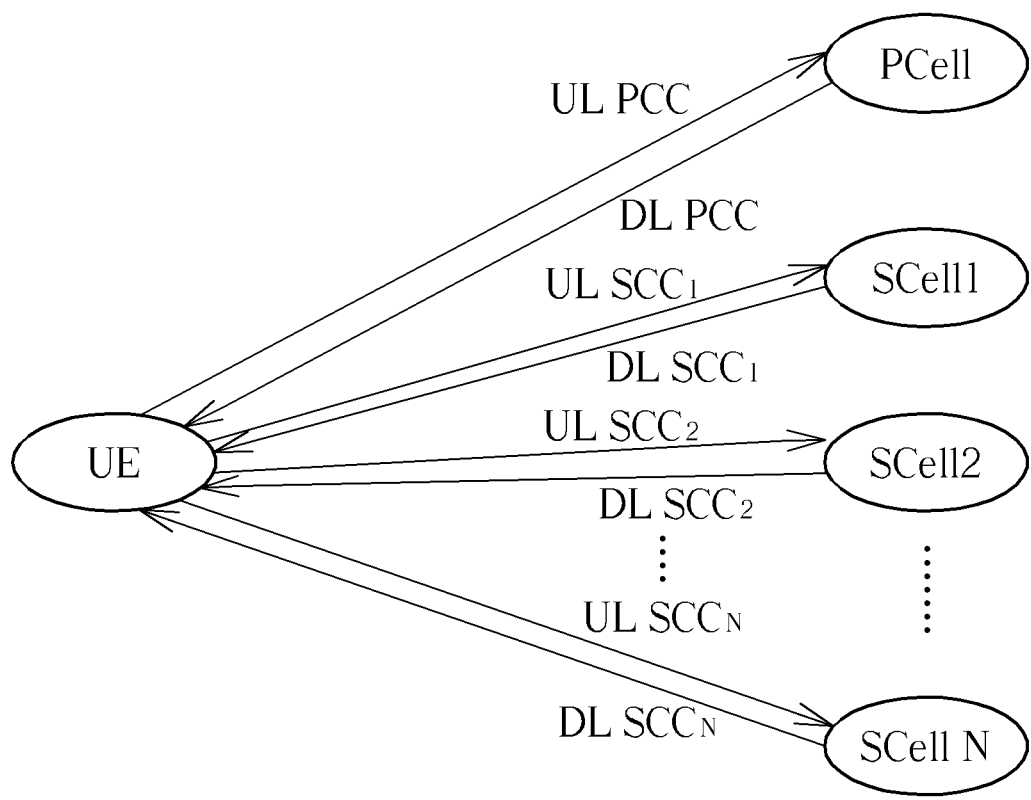
FIG. 2 is a schematic diagram of a user equipment and multiple cells under an eNB in a wireless communication system in FIG. 1.

Please refer to FIG. 2, which is a schematic diagram of a UE and multiple cells in the wireless communication system 10. The UE communicates with one primary serving cell (PCell) and several secondary serving cells (SCells), as SCell1-SCellN shown in FIG. 2. In the downlink, the component carrier corresponding to the PCell is the Downlink Primary Component Carrier (DL PCC) while in the uplink it is the Uplink Primary Component Carrier (UL PCC). Depending on UE capabilities, SCells can be configured to form together with the PCell a set of serving cells. In the downlink, the component carrier corresponding to a SCell is a Downlink Secondary Component Carrier (DL SCC) while in the uplink it is an Uplink Secondary Component Carrier (UL SCC). Note that, the PCell is always configured with DL PCC and UL PCC, and the SCell can be configured only with DL SCC.

Figure 3:
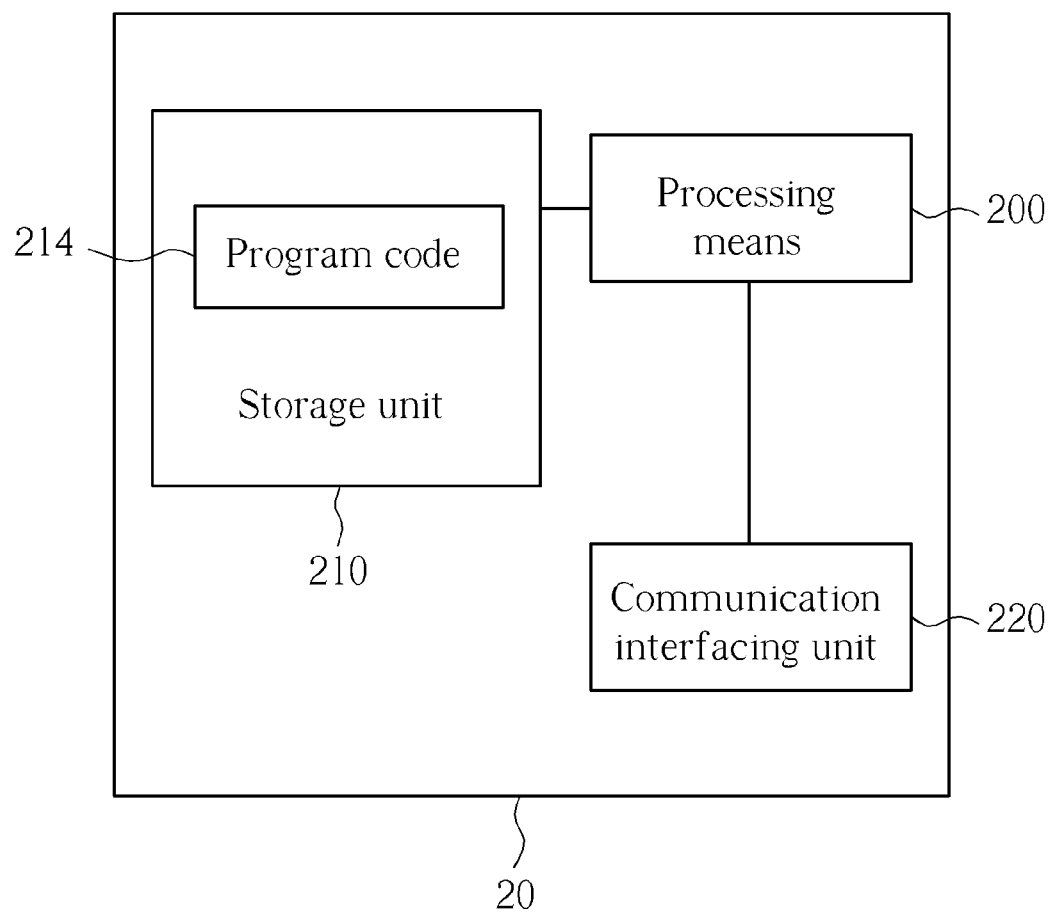
FIG. 3 illustrates a schematic diagram of an exemplary communication device.

FIG. 3 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 4:
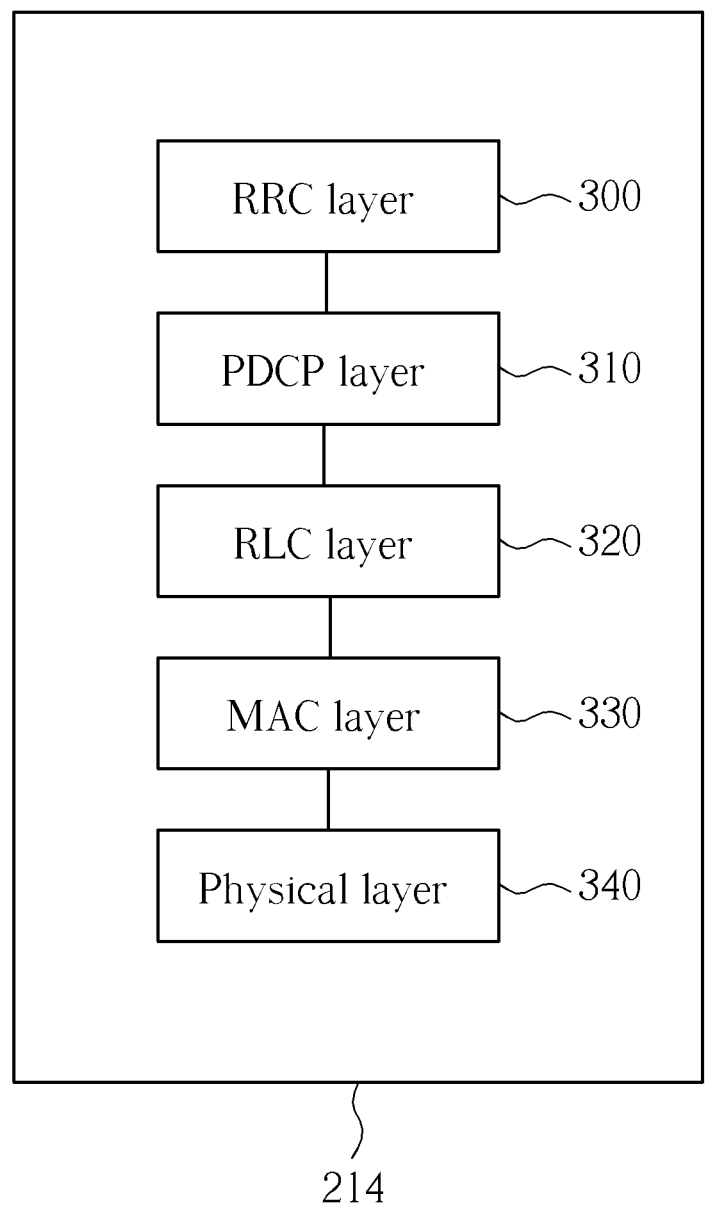
FIG. 4 illustrates a schematic diagram of communication protocol layers for an exemplary communication system.

Please refer to FIG. 4, which illustrates a schematic diagram of communication protocol layers for LTE-A system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. The MAC layer 330 is responsible for generating a MAC PDU (Protocol Data Unit) including power headroom information when a power headroom reporting (PHR) is triggered.

As to UE transmission architecture, the UE may equip one or more radio frequency (RF) modules, RF chains, and/or power amplifiers (PAs) for RF signal transmission. Each RF module or PA may support one or more than one uplink component carriers. Therefore, power limitation of the RF module and/or PA shall be taken into consideration in LTE-A system. Otherwise, it is difficult to allocate power resource for each component carrier. In some embodiments, the power limitation may be provided by a manufacturer of the UE or an antenna producer, and may be varied with different manufacturers or producers. In other embodiments, the minimum required power limitation may be defined in the technical specification, and UEs should be manufactured to meet at least the minimum requirements. Or, the power limitation of a PA may be the same as the UE maximum Output power (e.g., 23 dBm or 25 dBm). Besides, the power limitation may be adjusted by a dedicated signalling or broadcast signalling transmitted from the network (e.g. an eNB).

Figure 5:
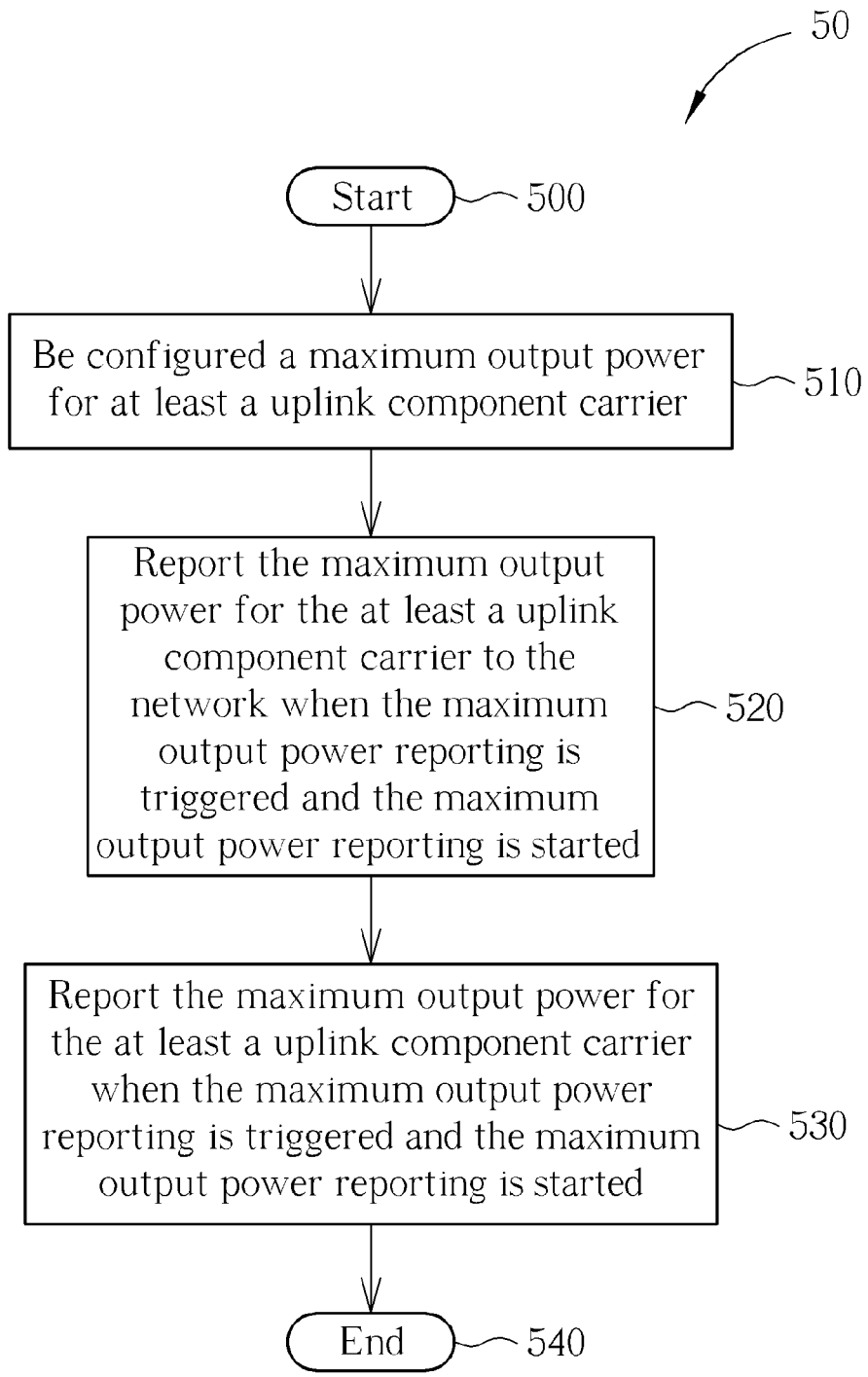
FIG. 5 is a flowchart of an exemplary process.

Please refer to FIG. 5, which illustrates a flowchart of an exemplary process 50. The process 50 is utilized in a UE configured with a plurality of uplink component carriers and/or parallel PUCCH and PUSCH transmission, for a maximum output power reporting. The process 50 can be compiled into the program code 214 and includes the following steps:

Step 500: Start.

Step 510: Be configured a maximum output power for at least a uplink component carrier.

Step 520: Determine to start or stop a maximum output power reporting for the at least a uplink component carrier according to a characteristic associated to the UE or the network.

Step 520: Report the maximum output power for the at least a uplink component carrier to the network when the maximum output power reporting is triggered and the maximum output power reporting is started.

Step 520: End.

According to the process 50, the UE first determines whether to start or stop the maximum output power reporting, and reports the maximum output power information when the maximum output power reporting is triggered and is started. Otherwise, the UE does not automatically report the maximum output power for the uplink component carriers. Based on the process, the UE does know how to perform the maximum output power reporting for an uplink component carrier.

More specifically, the UE may determine to start or stop the maximum output power reporting for the uplink component carriers (e.g. one or all activated uplink component carriers) based on an estimated transmission power, downlink and/or uplink channel quality, the number of configured and/or activated downlink and/or uplink component carriers, mapping information between uplink component carrier and corresponding PA, RF and/or antenna configuration, UL resource assignment, support of parallel PUCCH and PUSCH transmission, previous power headroom report, previous maximum output power report, network (e.g. eNB) and/or UE capability, uplink MIMO enabled and/or configured, timer based solution, or explicit signalling.

In detail, for the estimated transmission power, the maximum output power reporting may be started when (the sum of) estimated transmission power of corresponding uplink component carriers is going to or may exceed the maximum output power value, UE and/or PA power limitation. For the downlink and/or uplink channel quality (e.g., CQI, CMI, RI, RSRP, RSRQ, Sounding Reference signalling (SRS)), the maximum output power reporting may be started when downlink and/or uplink channel quality is (bad or) worst than a threshold. The threshold value may be provided by the network in advance. For the number of configured and/or activated downlink and/or uplink SCells, the maximum output power reporting may be started if there is more than one uplink SCells configured or activated to the UE. For mapping information between uplink component carrier(s) and PA, the maximum output power reporting may be started if there is more than one configured and/or activated uplink component carriers mapped to a PA. Note that, one maximum output power reporting of an uplink component carrier may be started for all uplink component carriers mapped to this PA. In this case, the UE may provide the UE capability information (e.g., RF Tx architecture, the number of PAs, etc) to the network. In addition, the mapping information between the uplink component carriers and PA may be provided (e.g., in RRCConnectionReconfiguration and/or RRCConnectionReconfigurationComplete message). For the UL resource assignment, the maximum output power reporting for a component carrier may be started if there is UL resource (e.g., PUCCH or PUSCH resource) assigned for the component carrier for the TTI. For the support of parallel PUCCH and PUSCH transmission, the maximum output power reporting may be started if parallel PUCCH and PUSCH transmission is enabled or configured. For the previous power headroom report, the maximum output power reporting may be started if a negative power headroom value is reported. Or, the maximum output power reporting may be started if the power headroom report includes an indicator to inform the network that (the sum of) estimated transmission power of corresponding uplink component carriers may exceed the maximum output power, UE and/or PA limitation. For the previous maximum output power report, the maximum output power reporting may be started/stopped based on the previous maximum output power report and power headroom report. For the uplink MIMO enabled and/or configured, the maximum output power reporting may be started/stopped based on whether the uplink MIMO is enabled and/or configured, and/or based on whether higher modulation and coding scheme (e.g., 16QAM, 64QAM, etc) are applied. For timer based solution, the network may configure UE a timer. When the maximum output power reporting is started, the timer is started, whereas when the timer expires, the maximum output power reporting is stopped. For the explicit signalling, the maximum output power reporting may be started if an explicit signalling, indicating the need of the maximum output power report, is received from the network.

Note that, in an embodiment, after the UE determines to start or stop the maximum output power reporting, the UE may send a message to notify the network. In another embodiment, after the network determines to start or stop the maximum output power reporting, the network may send a message to notify the UE. This notification message may be a PHY, MAC, or RRC message. In an embodiment, the message may be used to notify the start or stop of the maximum output power reporting for all activated uplink component carriers within the UE. In another embodiment, the message may be used to notify the start or stop of the maximum output power reporting for some activated uplink component carriers. In addition, the message may include a bitmap. A bit in the bitmap is set to "1" to indicate the maximum output power of the corresponding uplink component carrier is reported or should be reported. Another bit in the bitmap is set to "0" to indicate the maximum output power of the corresponding uplink component carrier is not reported or should be stopped.

Moreover, the maximum output power reporting may be triggered when the power headroom reporting is triggered, when an uplink component carrier corresponding to a SCell is activated, when a timer configured by the network expires (and once the maximum output power is reported, the timer is restarted), when receiving a explicit signalling from the network for triggering the maximum output power reporting, when receiving an UL grant assignment for the component carrier, when downlink and/or uplink channel quality becomes worst than a threshold, when parallel PUCCH and PUSCH transmission is enabled and/or configured, when uplink MIMO is configured and/or enabled, when uplink transmission power is scaling, when the estimated transmission power for an uplink component carrier exceeds the corresponding maximum output power, or when (the sum of) estimated transmission power of corresponding uplink component carriers exceeds the UE and/or PA limitation.

As to the maximum output power report format, several methods are proposed. One is to report the maximum output power value directly, and another is to report a simplified maximum output power report, to avoid overhead reporting. For simplified reporting method, the UE may report the maximum output power with a difference value (i.e. a delta value), may only report one maximum output power value for two or more component carriers, which have the same or similar maximum output power value, or may report the maximum output power value and a power headroom report in the same message.

For reporting the maximum output power with the difference value, the UE may use the same format or different formats for each maximum output power reporting. If the UE use different formats, such as a long format and a short format, the long format may be used for maximum output power value reporting, and the short format may be used for the difference value. In this situation, a logic channel identity (LCID) in a MAC subheader may be used to indicate that the long format or the short format is adopted.

Figure 6:
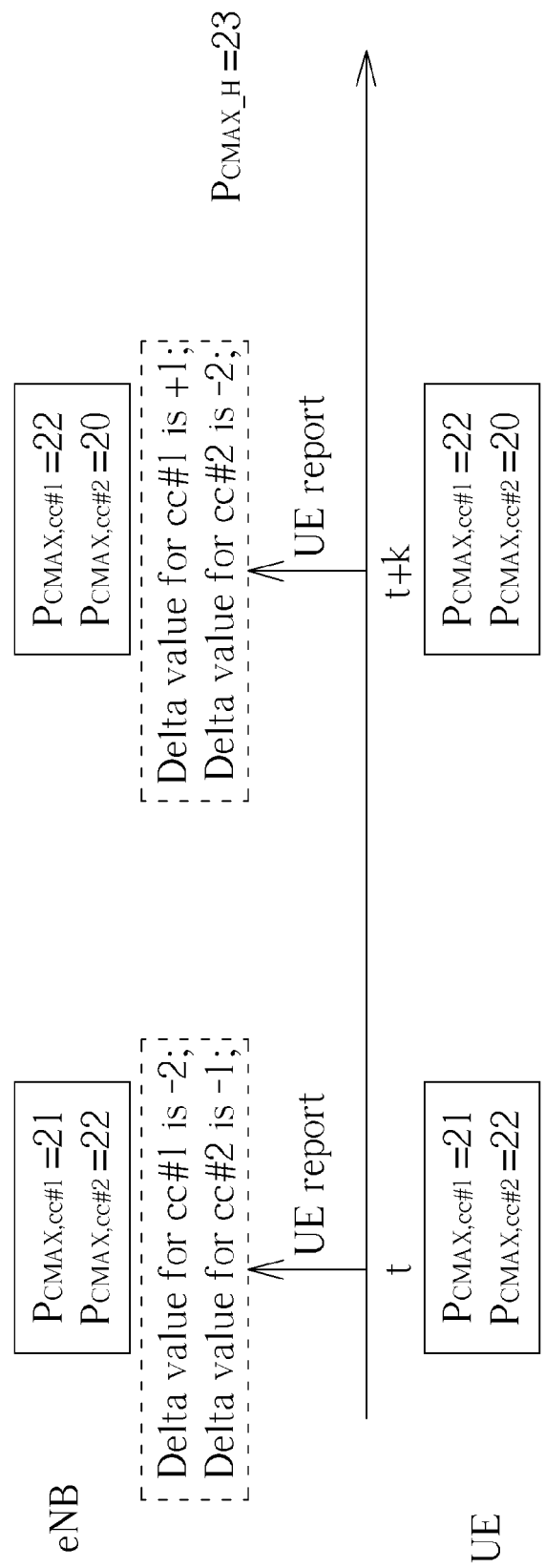
FIG. 6 illustrates a schematic diagram of a single format used in a maximum output power report.

For detailed description, please refer to FIGS. 6-11. Please refer to FIG. 6, which illustrates a schematic diagram of a single format used in a maximum output power report. In FIG. 6, only one format is used. The difference value (as Delta value in FIG. 6) may be based on the previous maximum output power value for the same uplink component carrier. Assume the first maximum output power report indicates the maximum output power value is 23 dBm, which can be a value configured by the network or a pre-defined value. The current maximum output power value $P_{CMAX,CC\#1}$ for a first uplink component carrier CC#1 is 21 dBm, and maximum output power value $P_{CMAX,CC\#2}$ for a second uplink component carrier CC#2 is 22 dBm. In this situation, the UE reports that Delta value for the first uplink component carrier CC#1 is "−2" and Delta value for the second uplink component carrier CC#2 is "−1". In next reporting, the UE reports the maximum output power based on the previous maximum output power values $P_{CMAX,CC\#1}$=21 and $P_{CMAX,CC\#2}$=22. Therefore, for the current maximum output power values $P_{CMAX,CC\#1}$=22 and $P_{CMAX,CC\#2}$=20, the UE reports that Delta value for the first uplink component carrier CC#1 is "+1", and Delta value for the second uplink component carrier CC#2 is "−2".

Figure 7:
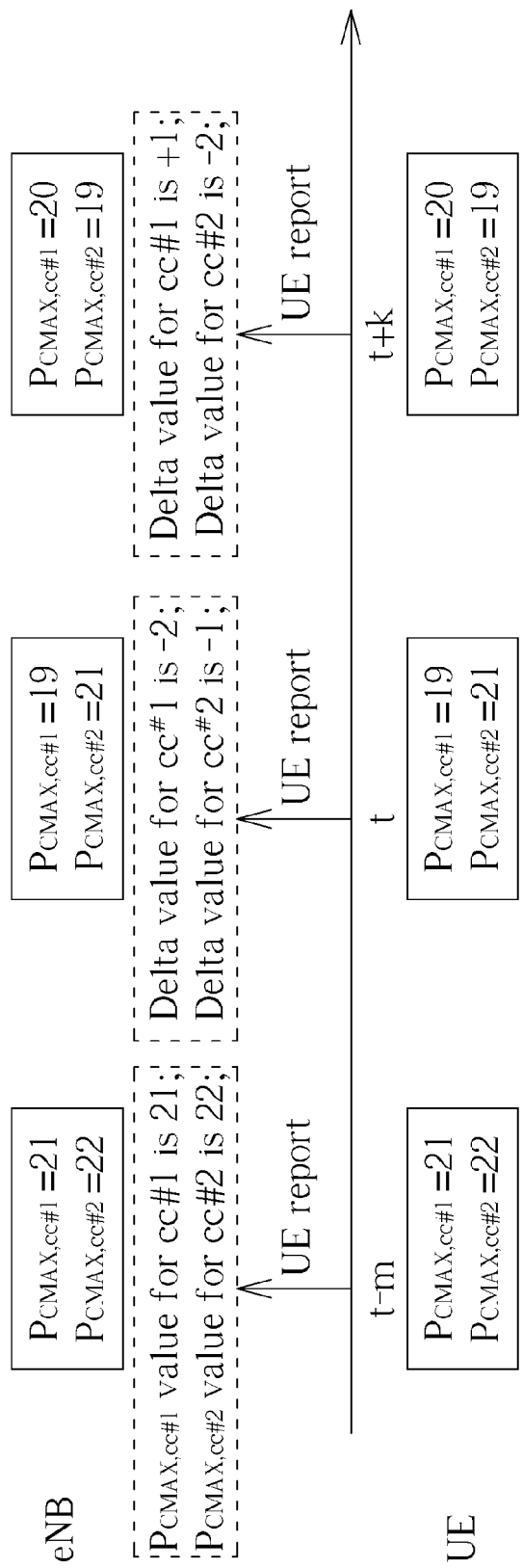
FIG. 7 illustrates a schematic diagram of multiple formats used in a maximum output power report.

Please refer to FIG. 7, which illustrates a schematic diagram of multiple formats used in a maximum output power report. In FIG. 7, more than one format (e.g. the long and short format) is used. As shown in FIG. 7, UE directly reports the maximum output power value $P_{CMAX,CC\#1}$=21 and the maximum output power value $P_{CMAX,CC\#2}$=22 with the long format. In next reporting, the UE reports the maximum output power based on the previous maximum output power values $P_{CMAX,CC\#1}$=21 and $P_{CMAX,CC\#2}$=22. Therefore, for the current maximum output power values $P_{CMAX,CC\#1}$=19 and $P_{CMAX,CC\#2}$=21 the UE reports that Delta value for the first uplink component carrier CC#1 is "−2", and Delta value for the second uplink component carrier CC#2 is "−1" with the short format.

Figure 8:
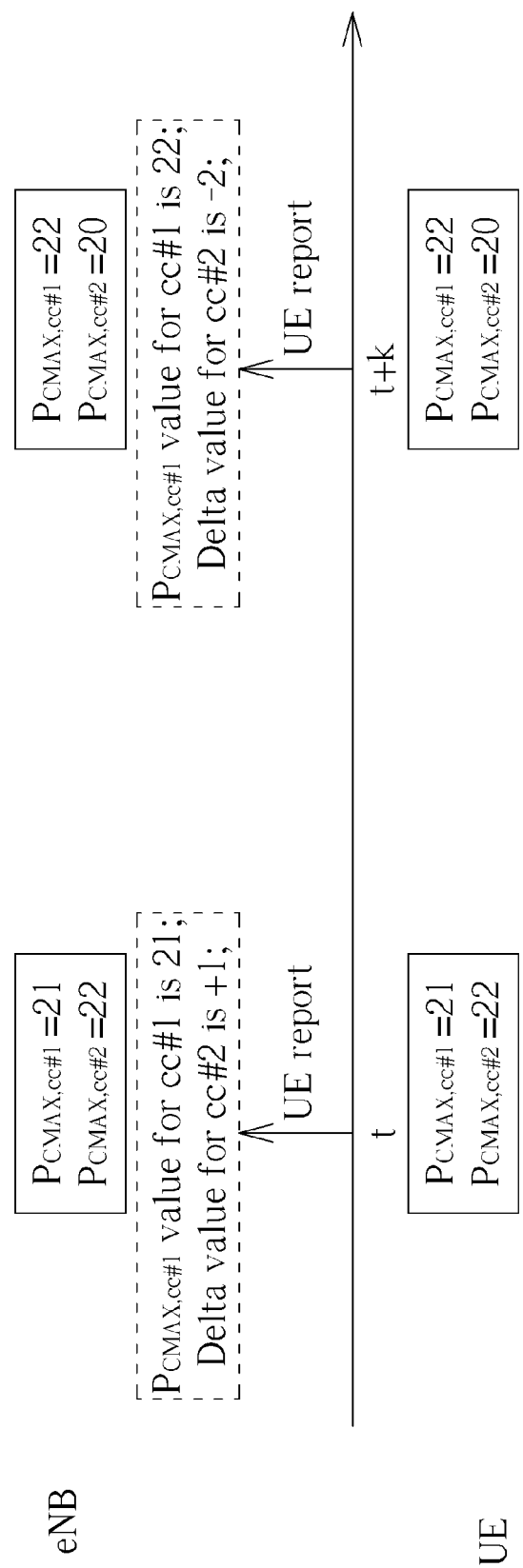
FIG. 8 illustrates a schematic diagram of a maximum output power report format according to a first embodiment.

Please refer to FIG. 8, which illustrates a schematic diagram of a maximum output power report format according to a first embodiment. In FIG. 8, the Delta value may be based on maximum output power value of a PCell or UL PCC in FIG. 2. Assume, the uplink component carrier CC#1 is the UL PCC. In this situation, the UE directly reports the maximum output power value $P_{CMAX,CC\#1}$=21 (e.g. with long format) to the network, and reports that Delta value for the second uplink component carrier CC#2 is "+1" (e.g. with short format) to the network.

Figure 9:
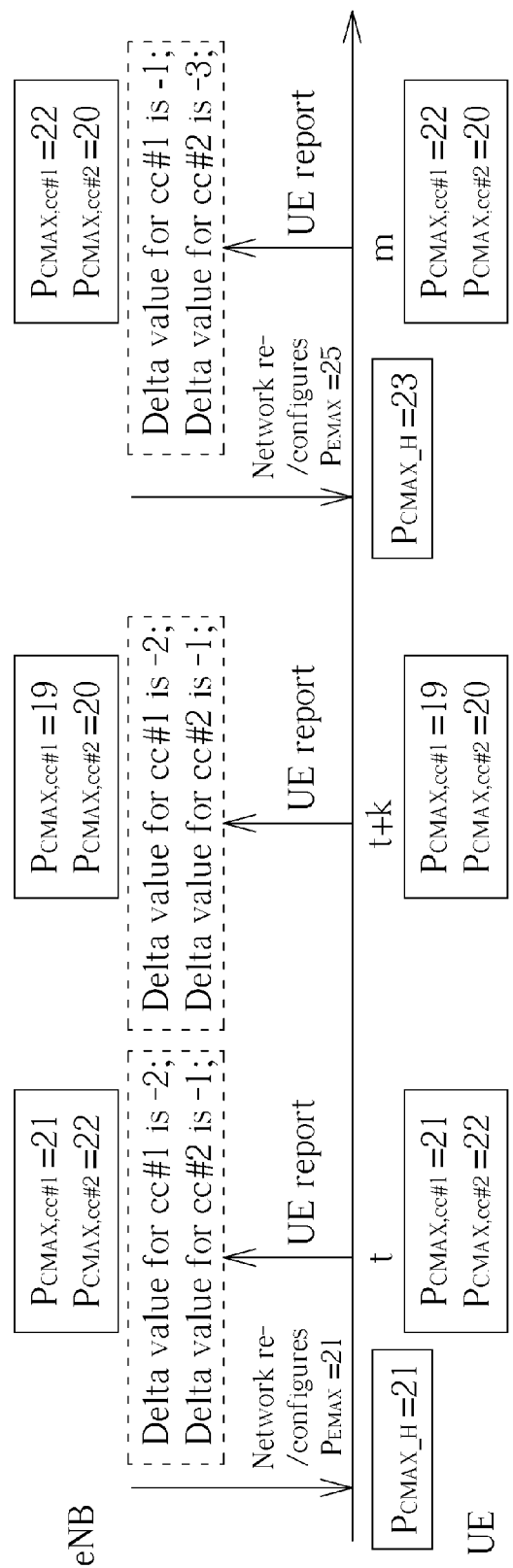
FIG. 9 illustrates a schematic diagram of a maximum output power report format according to a second embodiment.

Please refer to FIG. 9, which illustrates a schematic diagram of a maximum output power report format according to a second embodiment. The Delta value is based on a UE maximum output power $P_{powerclass}$ and a maximum allowed UE output power $P_{EMAX}$ signalled by higher layers. For example, a predetermined value $P_{CMAX\_H}$, is determined by a formula MIN $\{P_{EMAX}, P_{PowerClass}\}$. Assume the UE maximum output power $P_{powerclass}$=23, and the network configures UE with $P_{EMAX}$=21. According to the formula, the predetermined value $P_{CMAX\_H}$=21. Thus, for the current maximum output power values $P_{CMAX,CC\#1}$=21 and $P_{CMAX,CC\#2}$=20 the UE reports that Delta value for the first uplink component carrier CC#1 is "0" and Delta value for the second uplink component carrier CC#2 is "−1". In next reporting, if the network reconfigures the $P_{EMAX}$, the UE calculates the new $P_{CMAX\_H}$, and then reports the Delta value according to the new $P_{CMAX\_H}$. The detailed description or definition of the abovementioned parameters can be referred to 3GPP TS 36.101 specification.

Figure 10:
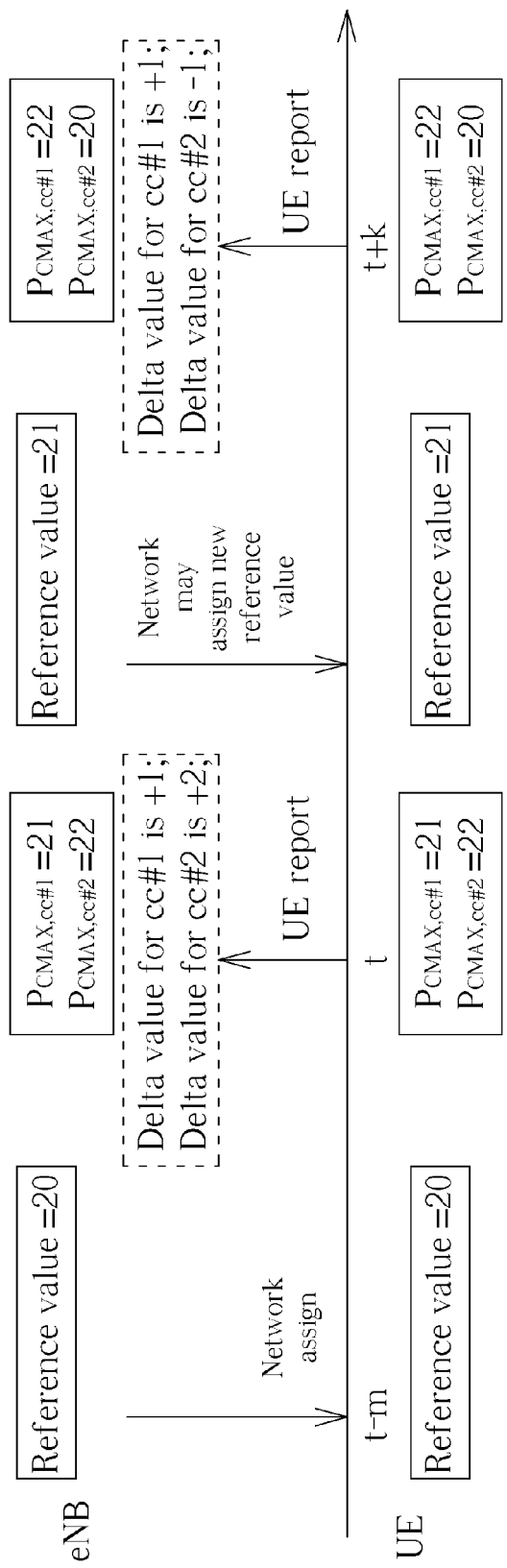
FIG. 10 illustrates a schematic diagram of a maximum output power report format according to a third embodiment.

Please refer to FIG. 10, which illustrates a schematic diagram of a maximum output power report format according to a third embodiment. The Delta value is based on the network pre-configuration. For example, the network assigns a reference value to the UE. Assume the reference value is 20. For the current maximum output power values $P_{CMAX,CC\#1}$=21 and $P_{CMAX,CC\#2}$=22 the UE reports the Delta value for the first uplink component carrier CC#1 is "+1", and Delta value for the second uplink component carrier CC#2 is "+2". If the network reconfigures a new reference value (e.g. Reference value=21) to the UE, the UE shall use this new reference value for reporting the Delta value.

Figure 11:
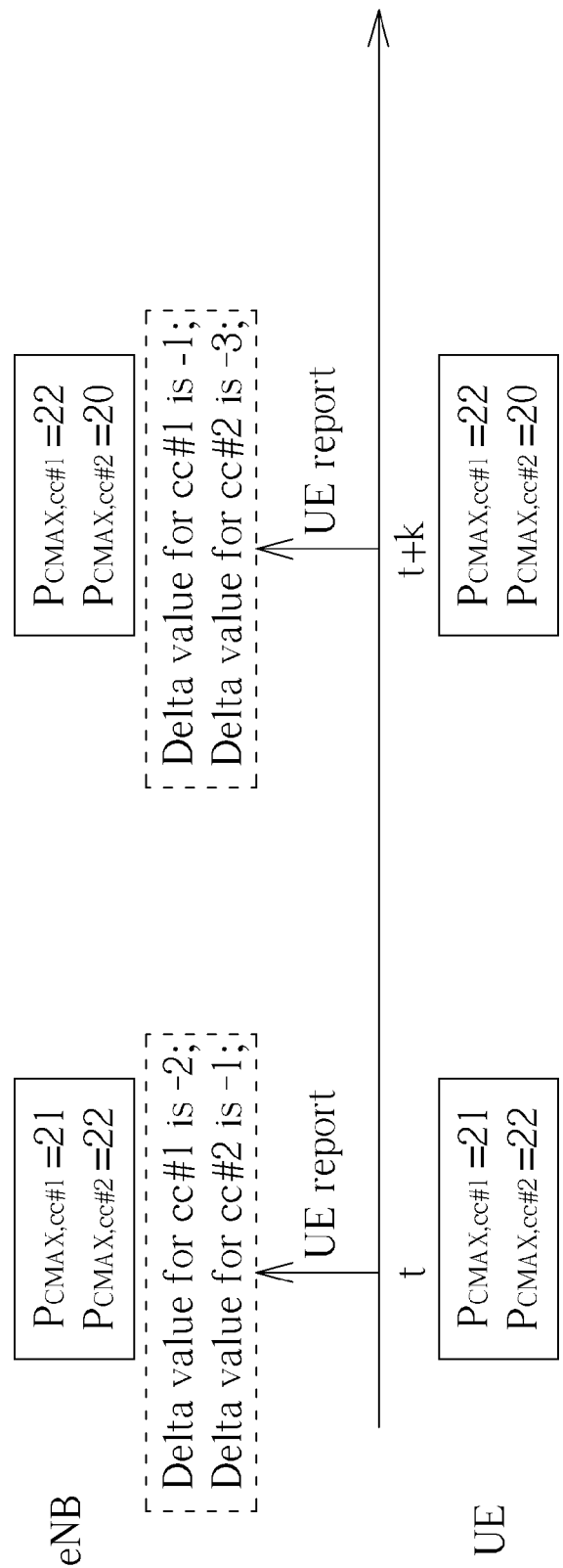
FIG. 11 illustrates a schematic diagram of a maximum output power report format according to a fourth embodiment.

Please refer to FIG. 11, which illustrates a schematic diagram of a maximum output power report format according to a fourth embodiment. The Delta value is based on the pre-defined value. This value may be defined in the specification for LTE-A system or stored in the UE. Assume the predefined value is 23. The current maximum output power value $P_{CMAX,CC\#1}$ for a first uplink component carrier CC#1 is 21 dBm, and maximum output power value $P_{CMAX,CC\#2}$ for a second uplink component carrier CC#2 is 22 dBm. In this situation, the UE reports the Delta value for the first uplink component carrier CC#1 is "−2", and Delta value for the second uplink component carrier CC#2 is "−1".

On the other hand, as abovementioned, the UE may report one maximum output power value for more than one uplink component carriers. In an embodiment, these uplink component carriers may have the same (or similar) maximum output power value. For example, these uplink component carriers may be mapped the same PA. In some embodiments, the UE may choose the same maximum output power value for these uplink component carriers for which the maximum output power value is in-between their limitations. In some embodiments, the UE may choose the same maximum output power value for the uplink component carriers which share the same PA. Therefore, the UE reports one maximum output power value for the uplink component carriers which share the same PA. Note that, the UE may inform the network the mapping of the uplink component carriers and PA by UE capability negotiation message, or by RRC message/MAC control element. In addition, the UE may inform the network which uplink component carriers share the same maximum output power value by RRC message/MAC control element.

An indicator in the report message may indicate which component carrier (or cell) refers to this maximum output power value or this Delta value. Besides, the indicator may be a bitmap. For example, the bitmap is used to indicate which component carrier this maximum output power value is applied to. In detail, a bit in the bitmap is set to "1" to indicate that the corresponding cell may apply this maximum output power value. A bit in the bitmap is set to "0" to indicate that the corresponding cell may not apply this maximum output power value. For another example, the bitmap is used to indicate which component carrier this Delta value is applied to.

Besides, the UE may send power headroom report in one message (e.g. MAC CE) and/or send maximum output power report in another message (e.g. MAC CE). These two MAC CEs may be transmitted at the same time (e.g. subframe). Or, these two MAC CEs may be transmitted on the same uplink component carrier and/or on different uplink component carriers. Moreover, two or more LCIDs may be used for maximum output power report and power headroom report. For example, one LCID is used for the power headroom report, and another LCID is used for the maximum output power report.

Figure 12:
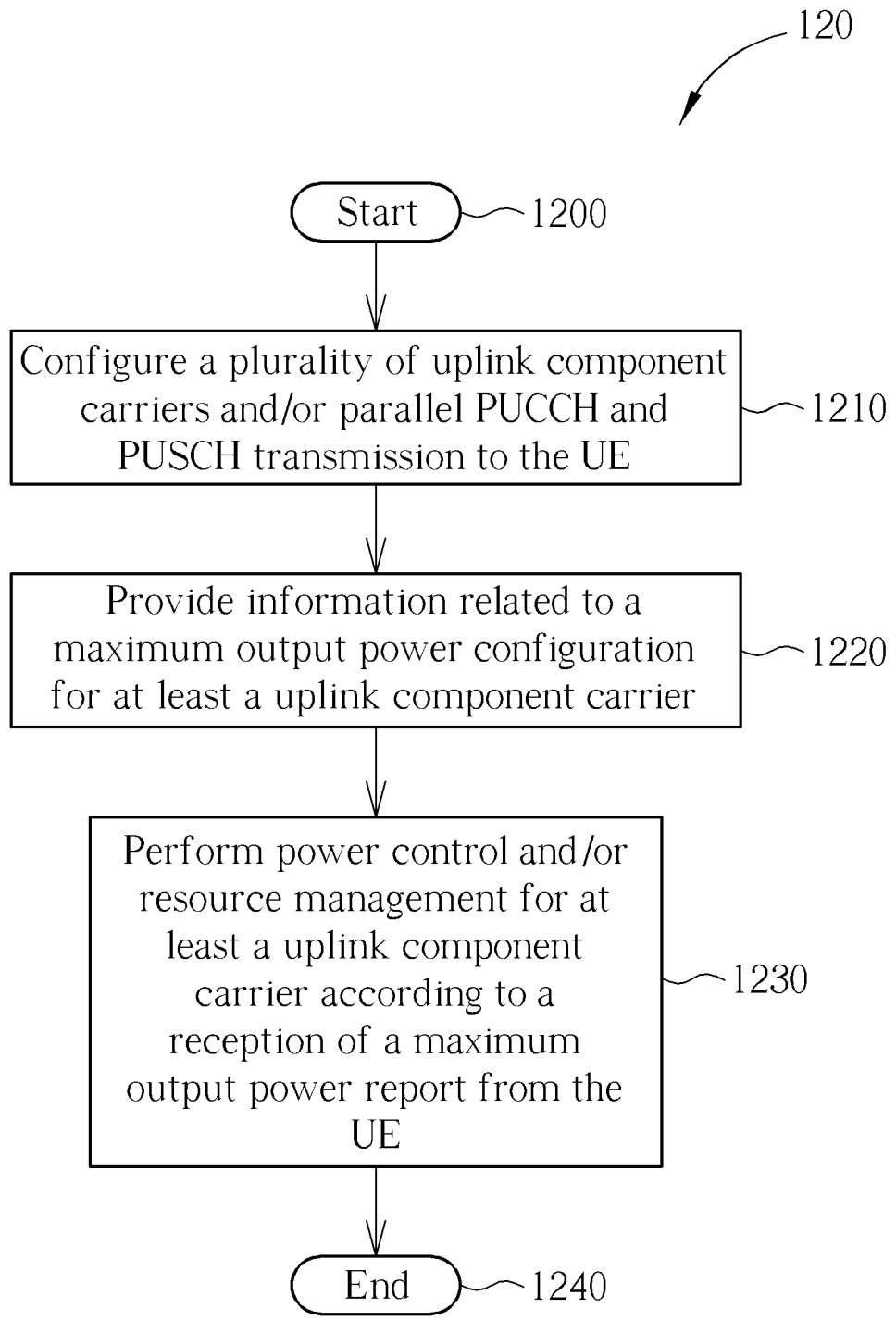
FIG. 12 is a flowchart of an exemplary process.

Please refer to FIG. 12, which illustrates a flowchart of an exemplary process 120. The process 120 is utilized in a network (e.g. eNB) for handling power reporting. The process 120 can be compiled into the program code 214 and includes the following steps:

Step 1200: Start.

Step 1210: Configure a plurality of uplink component carriers and/or parallel PUCCH and PUSCH transmission to the UE.

Step 1220: Provide information related to a maximum output power configuration for at least an uplink component carrier.

Step 1230: Perform power control and/or resource management for at least an uplink component carrier according to a reception of a maximum output power report from the UE.

Step 1240: End.

According to the process 120, the network controls uplink transmission power and/or manage uplink resource (e.g. resource block (RB) assignment, modulation and coding scheme (MCS)) based on not only the power headroom report but also the maximum output power report. For example, the network may estimate the UE's transmission power on a corresponding uplink component carrier by (maximum output power value—the reported power headroom value). Therefore, the network may not allocate transmission power on an uplink component carrier exceeds the corresponding maximum output power value/PA power limitation, and/or UE power limitation.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the present invention provides methods and apparatus for power reporting (e.g. the maximum output power for an uplink component carrier) in multiple uplink component carrier system, so that the network can perform power control and resource management well.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of power reporting for a mobile device configured with a plurality of uplink component carriers and/or parallel physical uplink control channel (PUCCH) and physical uplink shared channel (PUSCH) transmission in a wireless communication system, the method comprising:

being configured a maximum output power for at least a uplink component carrier;

determining whether to start a maximum output power reporting for the at least a uplink component carrier according to a characteristic associated to the mobile device or a network of the wireless communication system;

reporting the maximum output power for the at least a uplink component carrier to the network when the maximum output power reporting is triggered;

determining whether to stop a maximum output power reporting for the at least an uplink component carrier according to a characteristic associated to the mobile device or a network of the wireless communication system, when the maximum output power reporting is started; and stopping reporting the maximum output power for the at least an uplink component carrier to the network, when it is determined to stop reporting.

2. The method of claim 1, wherein the characteristic associated to the mobile device or the network comprises estimated transmission power, downlink and/or uplink channel quality, a number of configured and/or activated downlink and/or uplink component carrier, mapping information between the at least a uplink component carrier and a power amplifier, a radio frequency and/or antenna configuration, uplink resource assignment, support of parallel PUCCH and PUSCH transmission, a previous power headroom report, a previous maximum output power report, network and/or mobile device capability, uplink MIMO enabled and/or configured, timer based solution, explicit signaling.

3. The method of claim 1, further comprising:
when determining to start or stop the maximum output power reporting for the at least a uplink component carrier, transmitting a message to notify the network.

4. The method of claim 3, wherein the message indicates that the start or stop of the maximum output power reporting for all or some uplink component carriers of the plurality of component carriers; or the message includes a bitmap for indicating the start or stop of the maximum output power reporting for a corresponding component carrier.

5. The method of claim 1, wherein the maximum output power reporting is triggered according to whether a power headroom reporting (PHR) is triggered, whether a uplink secondary component carrier is activated and/or configured, expiry of a timer configured by the network, a explicit signaling received from the network for triggering the maximum output power reporting, uplink grant assignment, a condition of a downlink and/or uplink channel quality, parallel PUCCH and PUSCH transmission enabled and/or configured, uplink MIMO configured and/or enabled, scaling of a uplink transmission power, whether an estimated transmission power for a uplink component carrier exceeds the maximum output power of the uplink component carrier, or whether estimated transmission power for at least a uplink component carrier exceeds a power limitation of the mobile device and/or a power amplifier configured for the at least a uplink component carrier.

6. The method of claim 1, wherein reporting the maximum output power for the at least a uplink component carrier to the network when the maximum output power reporting is triggered comprises:
reporting the maximum output power value for the at least a uplink component carrier directly when the maximum output power reporting is triggered; or
reporting the maximum output power value for the at least a uplink component carrier with a difference value when the maximum output power reporting is triggered; or
reporting one maximum output power value for the at least a uplink component carrier when the maximum output power reporting is triggered; or
reporting the maximum output power value for the at least a uplink component carrier in the same messages for a power headroom reporting (PHR) when the maximum output power reporting is triggered.

7. The method of claim 6, wherein reporting the maximum output power value for the at least a uplink component carrier with a difference value when the maximum output power reporting is triggered comprises:
reporting the maximum output power value for the at least a uplink component carrier with a difference value between a previous maximum output power value and the maximum output power value on the same component carrier when the maximum output power reporting is triggered; or
reporting the maximum output power value for the at least a uplink component carrier with a difference value between a maximum output power value of a primary uplink component carrier and the maximum output power value when the maximum output power reporting is triggered; or
reporting the maximum output power value for the at least a uplink component carrier with a difference value between a value of a maximum output power of the mobile device or a maximum allowed output power of the mobile device, and the maximum output power value when the maximum output power reporting is triggered; or
reporting the maximum output power value for the at least a uplink component carrier with a difference value between a reference value configured by the network and the maximum output power value when the maximum output power reporting is triggered and the maximum output power reporting is started; or
reporting the maximum output power value for the at least a uplink component carrier with a difference value between a predefined value stored in the mobile device and the maximum output power value when the maximum output power reporting is triggered.

8. The method of claim 6, wherein reporting one maximum output power value for the at least a uplink component carrier when the maximum output power reporting is triggered comprises:
reporting one maximum output power value for the at least a uplink component carrier having the same or similar maximum output power when the maximum output power reporting is triggered; or
reporting one maximum output power value for the at least a uplink component carrier when the maximum output power reporting is triggered, wherein the maximum output power value is in-between limitations of the at least a uplink component carrier; or
reporting one maximum output power value for the at least a uplink component carrier sharing the same power amplifier when the maximum output power reporting is triggered.

9. A mobile device of a wireless communication system for power reporting, the mobile device being configured with a plurality of uplink component carriers and/or parallel physical uplink control channel (PUCCH) and physical uplink shared channel (PUSCH) transmission and comprising:
means for being configured a maximum output power for at least a uplink component carrier;
means for determining whether to start a maximum output power reporting for the at least a uplink component carrier according to a characteristic associated to the mobile device or a network of the wireless communication system;
means for reporting the maximum output power for the at least a uplink component carrier to the network when the maximum output power reporting is triggered;
means for determining whether to stop a maximum output power reporting for the at least an uplink component carrier according to a characteristic associated to the mobile device or a network of the wireless communication system, when the maximum output power reporting is started; and
means for stopping reporting the maximum output power for the at least an uplink component carrier to the network, when it is determined to stop reporting.

10. The mobile device of claim 9, wherein the characteristic associated to the mobile device or the network comprises estimated transmission power, downlink and/or uplink channel quality, a number of configured and/or activated downlink and/or uplink component carrier, mapping information between the at least a uplink component carrier and a power amplifier, a radio frequency and/or antenna configuration, uplink resource assignment, support of parallel PUCCH and PUSCH transmission, a previous power headroom report, a previous maximum output power report, network and/or mobile device capability, uplink MIMO enabled and/or configured, timer based solution, explicit signaling.

11. The mobile device of claim 9, further comprising:
means for when determining to start or stop the maximum output power reporting for the at least a uplink component carrier, transmitting a message to notify the network.

12. The mobile device of claim 11, wherein the message indicates that the start or stop of the maximum output power reporting for all or some uplink component carriers of the plurality of component carriers; or the message includes a bitmap for indicating the start or stop of the maximum output power reporting for a corresponding component carrier.

13. The mobile device of claim 9, wherein the maximum output power reporting is triggered according to whether a power headroom reporting (PHR) is triggered, whether a uplink secondary component carrier is activated and/or configured, expiry of a timer configured by the network, a explicit signaling received from the network for triggering the maximum output power reporting, uplink grant assignment, a condition of a downlink and/or uplink channel quality, parallel PUCCH and PUSCH transmission enabled and/or configured, uplink MIMO configured and/or enabled, scaling of a uplink transmission power, whether an estimated transmission power for a uplink component carrier exceeds the maximum output power of the uplink component carrier, or whether estimated transmission power for at least a uplink component carrier exceeds a power limitation of the mobile device and/or a power amplifier configured for the at least a uplink component carrier.

14. The mobile device of claim 9, wherein the means for reporting the maximum output power for the at least a uplink component carrier to the network when the maximum output power reporting is triggered comprises:
means for reporting the maximum output power value for the at least a uplink component carrier directly when the maximum output power reporting is triggered; or
means for reporting the maximum output power value for the at least a uplink component carrier with a difference value when the maximum output power reporting is triggered; or
means for reporting one maximum output power value for the at least a uplink component carrier when the maximum output power reporting is triggered; or
means for reporting the maximum output power value for the at least a uplink component carrier in the same messages for a power headroom reporting (PHR) when the maximum output power reporting is triggered.

15. The mobile device of claim 14, wherein the means for reporting the maximum output power value for the at least a uplink component carrier with a difference value when the maximum output power reporting is triggered comprises:
means for reporting the maximum output power value for the at least a uplink component carrier with a difference value between a previous maximum output power value and the maximum output power value on the same component carrier when the maximum output power reporting is triggered; or
means for reporting the maximum output power value for the at least a uplink component carrier with a difference value between a maximum output power value of a primary uplink component carrier and the maximum output power value when the maximum output power reporting is triggered; or
means for reporting the maximum output power value for the at least a uplink component carrier with a difference value between a value of a maximum output power of the mobile device or a maximum allowed output power of the mobile device, and the maximum output power value when the maximum output power reporting is triggered; or
means for reporting the maximum output power value for the at least a uplink component carrier with a difference value between a reference value configured by the network and the maximum output power value when the maximum output power reporting is triggered; or
means for reporting the maximum output power value for the at least a uplink component carrier with a difference value between a predefined value stored in the mobile device and the maximum output power value when the maximum output power reporting is triggered.

16. The mobile device of claim 14, wherein the means for reporting one maximum output power value for the at least a uplink component carrier when the maximum output power reporting is triggered comprises:
means for reporting one maximum output power value for the at least a uplink component carrier having the same or similar maximum output power when the maximum output power reporting is triggered; or
means for reporting one maximum output power value for the at least a uplink component carrier when the maximum output power reporting is triggered, wherein the maximum output power value is in-between limitations of the at least a uplink component carrier; or
means for reporting one maximum output power value for the at least a uplink component carrier sharing the same power amplifier when the maximum output power reporting is triggered.

17. A method of handling power reporting for a network in a wireless communication system, the method comprising:
configuring a plurality of uplink component carriers and/or parallel physical uplink control channel (PUCCH) and physical uplink shared channel (PUSCH) transmission to a mobile device of the wireless communication system;
providing information related to a maximum output power configuration for at least a uplink component carrier;
determining whether to start a maximum output power reporting for the at least a uplink component carrier in the mobile device according to a characteristic associated to the mobile device or the network; and
when the maximum output power reporting is started, determining whether to stop a maximum output power reporting for the at least a uplink component carrier in the mobile device according to a characteristic associated to the mobile device or the network.

18. The method of claim 17, wherein the characteristic associated to the mobile device or the network comprises estimated transmission power, downlink and/or uplink channel quality, a number of configured and/or activated downlink and/or uplink component carrier, mapping information between the at least a uplink component carrier and a power amplifier, a radio frequency and/or antenna configuration, uplink resource assignment, support of parallel PUCCH and PUSCH transmission, a previous power headroom report, a previous maximum output power report, network and/or mobile device capability, uplink MIMO enabled and/or configured, timer based solution, explicit signaling.

19. The method of claim 17, further comprising:
when determining to start or stop the maximum output power reporting for the at least a uplink component carrier in the mobile device, transmitting a message to notify the mobile device.

20. The method of claim 19, wherein the message indicates that the start or stop of the maximum output power reporting for all or some uplink component carriers of the plurality of component carriers; or the message includes a bitmap for indicating the start or stop of the maximum output power reporting for a corresponding component carrier.

21. A network of a wireless communication system for handling power reporting, the network comprising:
    means for configuring a plurality of uplink component carriers and/or parallel physical uplink control channel (PUCCH) and physical uplink shared channel (PUSCH) transmission to a mobile device of the wireless communication system;
    means for providing information related to a maximum output power configuration for at least a uplink component carrier;
    means for determining whether to start a maximum output power reporting for the at least a uplink component carrier in the mobile device according to a characteristic associated to the mobile device or the network; and
    means for when the maximum output power reporting is started, determining whether to stop a maximum output power reporting for the at least a uplink component carrier in the mobile device according to a characteristic associated to the mobile device or the network.

22. The network of claim 20, wherein the characteristic associated to the mobile device or the network comprises estimated transmission power, downlink and/or uplink channel quality, a number of configured and/or activated downlink and/or uplink component carrier, mapping information between the at least a uplink component carrier and a power amplifier, a radio frequency and/or antenna configuration, uplink resource assignment, support of parallel PUCCH and PUSCH transmission, a previous power headroom report, a previous maximum output power report, network and/or mobile device capability, uplink MIMO enabled and/or configured, timer based solution, explicit signaling.

23. The network of claim 20, further comprising:
    means for when determining to start or stop the maximum output power reporting for the at least a uplink component carrier in the mobile device, transmitting a message to notify the mobile device.

24. The network of claim 23, wherein the message indicates that the start or stop of the maximum output power reporting for all or some uplink component carriers of the plurality of component carriers; or the message includes a bitmap for indicating the start or stop of the maximum output power reporting for a corresponding component carrier.

25. A method of power reporting for a mobile device configured with a plurality of uplink component carriers and/or parallel physical uplink control channel (PUCCH) and physical uplink shared channel (PUSCH) transmission in a wireless communication system, the method comprising:
    being configured a maximum output power for at least a uplink component carrier; and
    reporting the maximum output power for the at least a uplink component carrier to the network when a maximum output power reporting is triggered and the maximum output power reporting is determined to be started by the network.

26. The method of claim 25, wherein the maximum output power reporting is triggered according to whether a power headroom reporting (PHR) is triggered, whether a uplink secondary component carrier is activated and/or configured, expiry of a timer configured by the network, a explicit signaling received from the network for triggering the maximum output power reporting, uplink grant assignment, a condition of a downlink and/or uplink channel quality, parallel PUCCH and PUSCH transmission enabled and/or configured, uplink MIMO configured and/or enabled, scaling of a uplink transmission power, whether an estimated transmission power for a uplink component carrier exceeds the maximum output power of the uplink component carrier, or whether estimated transmission power for at least a uplink component carrier exceeds a power limitation of the mobile device and/or a power amplifier configured for the at least a uplink component carrier.

27. A mobile device of a wireless communication system for power reporting, the mobile device being configured with a plurality of uplink component carriers and/or parallel physical uplink control channel (PUCCH) and physical uplink shared channel (PUSCH) transmission and comprising:
    means for being configured a maximum output power for at least a uplink component carrier; and
    means for reporting the maximum output power for the at least a uplink component carrier to the network when a maximum output power reporting is triggered and the maximum output power reporting is determined to be started by the network.

28. The mobile device of claim 27, wherein the maximum output power reporting is triggered according to whether a power headroom reporting (PHR) is triggered, whether a uplink secondary component carrier is activated and/or configured, expiry of a timer configured by the network, a explicit signaling received from the network for triggering the maximum output power reporting, uplink grant assignment, a condition of a downlink and/or uplink channel quality, parallel PUCCH and PUSCH transmission enabled and/or configured, uplink MIMO configured and/or enabled, scaling of a uplink transmission power, whether an estimated transmission power for a uplink component carrier exceeds the maximum output power of the uplink component carrier, or whether estimated transmission power for at least a uplink component carrier exceeds a power limitation of the mobile device and/or a power amplifier configured for the at least a uplink component carrier.

* * * * *